United States Patent
Fairs et al.

(10) Patent No.: US 7,928,959 B1
(45) Date of Patent: *Apr. 19, 2011

(54) SYSTEM AND METHOD FOR MULTIPLE INDEPENDENT COMPUTER INPUTS USING UNIQUE DEVICE AND SOURCE IDENTIFICATION SYSTEMS

(75) Inventors: James R. Fairs, Naperville, IL (US); Vlad Zarney, Calabasas, CA (US)

(73) Assignee: IMI Innovations Inc., Naperville, IL (US)

( * ) Notice: Subject to any disclaimer, the term of this patent is extended or adjusted under 35 U.S.C. 154(b) by 829 days.

This patent is subject to a terminal disclaimer.

(21) Appl. No.: 11/172,631

(22) Filed: Jul. 1, 2005

Related U.S. Application Data (63) Continuation-in-part of application No. 11/123,934, filed on May 5, 2005.

(51) Int. Cl.
*G09G 5/00* (2006.01)
(52) U.S. Cl. .................................. 345/156; 345/163
(58) Field of Classification Search .............. 345/156, 345/157, 161, 163
See application file for complete search history.

(56) References Cited

U.S. PATENT DOCUMENTS

| | | | | |
|---|---|---|---|---|
| 5,634,095 A | * | 5/1997 | Wang et al. | 715/763 |
| 5,699,534 A | * | 12/1997 | Barber et al. | 715/856 |
| 5,896,125 A | * | 4/1999 | Niedzwiecki | 345/168 |
| 6,727,884 B1 | * | 4/2004 | Leatham et al. | 345/156 |
| 2002/0054023 A1 | | 5/2002 | Adan et al. | |

OTHER PUBLICATIONS

"Soft Design for Visual Environments," Chapter 3, Example 1-4 Notes, 2003, Clarkson University.

* cited by examiner

*Primary Examiner* — Stephen G Sherman
(74) *Attorney, Agent, or Firm* — Fernandez & Associates, LLP

(57) ABSTRACT

The implementation of a unique system for creating multiple independent computer inputs is described. The system utilizes interactive mouse hooks, raw input information, and subroutines for generating tagged windows mouse messages. Such tagged windows mouse messages are coupled with a cursor rendering application to generate second, third, or more independent cursors or control points. In addition, the system generates mouse input stream and discerns it from the hardware-generated input stream. The system-generated mouse input stream is further utilized in graphical user interface.

21 Claims, 10 Drawing Sheets

WMM_APPCOMMAND
WMM_CAPTURECHANGED
WMM_LBUTTONDBLCLK
WMM_LBUTTONDOWN
WMM_LBUTTONUP
WMM_MBUTTONDBLCLK
WMM_MBUTTONDOWN
WMM_MBUTTONUP
WMM_MOUSEACTIVATE
WMM_MOUSEHOVER
WMM_MOUSELEAVE
WMM_MOUSEMOVE
WMM_MOUSEWHEEL
WMM_NCHITTEST
WMM_NCLBUTTONDBLCLK
WMM_NCLBUTTONDOWN
WMM_NCLBUTTONUP
WMM_NCMBUTTONDBLCLK
WMM_NCMBUTTONDOWN
WMM_NCMBUTTONUP
WMM_NCMOUSEHOVER
WMM_NCMOUSELEAVE
WMM_NCMOUSEMOVE
WMM_NCRBUTTONDBLCLK
WMM_NCRBUTTONDOWN
WMM_NCRBUTTONUP
WMM_NCXBUTTONDBLCLK
WMM_NCXBUTTONDOWN
WMM_NCXBUTTONUP
WMM_RBUTTONDBLCLK
WMM_RBUTTONDOWN
WMM_RBUTTONUP
WMM_XBUTTONDBLCLK
WMM_XBUTTONDOWN
WMM_XBUTTONUP

SYSTEM AND METHOD FOR MULTIPLE INDEPENDENT COMPUTER INPUTS USING UNIQUE DEVICE AND SOURCE IDENTIFICATION SYSTEMS

CROSS REFERENCE TO RELATED APPLICATIONS

This application is a continuation-in-part of U.S. patent application Ser. No. 11/123,934, filed May 5, 2005, by James Fairs and Vlad Zarney, entitled "SYSTEM AND METHOD FOR IMPROVED CURSOR FUNCTIONALITY". Prior to describing the teaching of this invention, it will be instructive to review the teachings of the commonly assigned U.S. patent applications.

BACKGROUND

1. Field of the Invention

The invention relates generally to an interface for graphical input devices and control points and, more specifically, the teaching in accordance with this invention relates to systems and methods for multiple independent computer inputs generation.

2. Related Art

Multiple independent computer inputs could be created and used to allow users to input and utilize data faster and more efficiently. The value of multiple computer inputs includes increased neuron-pathway development for young users, increased efficiency, reduced repetitive motion and stress injuries, reduced eye strain due to accommodation from keyboard to screen, enhanced navigation (particularly in the case of multiple screens), and the simplification of otherwise complex tasks. Conventionally, the multiple independent inputs are either not created or not isolated adequately.

As should be apparent, there is a need for providing improved methodologies for creating multiple computer inputs. The goal of this invention is to overcome the limitations and boundaries of traditional computer input methodology. Novel methods and systems supporting such a system are described herein.

SUMMARY

Methods and systems for multiple independent computer inputs using unique device and source identification systems are disclosed. A system comprising processors, memories, graphical input interface, and low-level mouse hook is described herein in the present invention. A preferred embodiment is disclosed in detail. The embodiment comprises a device identifier to discern and separate raw input messages according to their sources of graphical input device. The embodiment further comprises a subroutine residing in a low-level mouse hook to generate tagged window mouse messages which, in turn, are used as inputs for a single or a plurality of cursor-rendering applications. Optionally, the disclosed embodiment also comprises a mouse input stream generator to generate system-generated mouse input stream which is injected back to input cue. Another subroutine residing in a low-level mouse hook discerns system-generated mouse input stream from hardware-generated mouse input stream. The hardware-generated mouse input stream is blocked within the subroutine. The system-generated mouse input stream is used for target window procedures.

This summary does not purport to define the invention. The invention is defined by the claims.

DETAILED DESCRIPTION

The teachings of this invention are related to some extent to the subject matter described in copending U.S. patent application Ser. No. 11/123,934, filed May 5, 2005, entitled "SYSTEM AND METHOD FOR IMPROVED CURSOR FUNCTIONALITY", by James Fairs and Vlad Zarney, incorporated by reference herein in its entirety. Prior to describing the teachings of this invention, it will be instructive to review the teachings of the commonly assigned U.S. patent application Ser. No. 10/618,543.

In the following description, reference is made to the accompanying drawings which form a part hereof, and which show, by way of illustration, a preferred embodiment of the present invention. It is understood that other embodiments may be utilized and structural changes may be made without departing from the scope of the present invention. The following detailed description of the preferred embodiment presents a specific embodiment of the present invention. However, the present invention can be embodied in a multitude of different ways as will be defined and covered by the claims.

In brief, the invention described in U.S. patent application Ser. No. 11/123,934, filed May 5, 2005, entitled "SYSTEM AND METHOD FOR IMPROVED CURSOR FUNCTIONALITY" by James Fairs and Vlad Zarney, provides a system for implementing novel functionality associated with cursors or control points. The system described in that invention installs subroutines in a single or a plurality of low-level mouse hooks to monitor the mouse messages and to instruct listening applications to respond to the movement of cursors and control points. Examples of such responses include, but are not limited to, the availability of context menus, application menus, cursor movements restricted to pre-defined formats, or the creation of control over several actions simultaneously using the same cursor. Functionality resulting from these responses greatly enhances the speed and convenience in data input.

Figure 1:
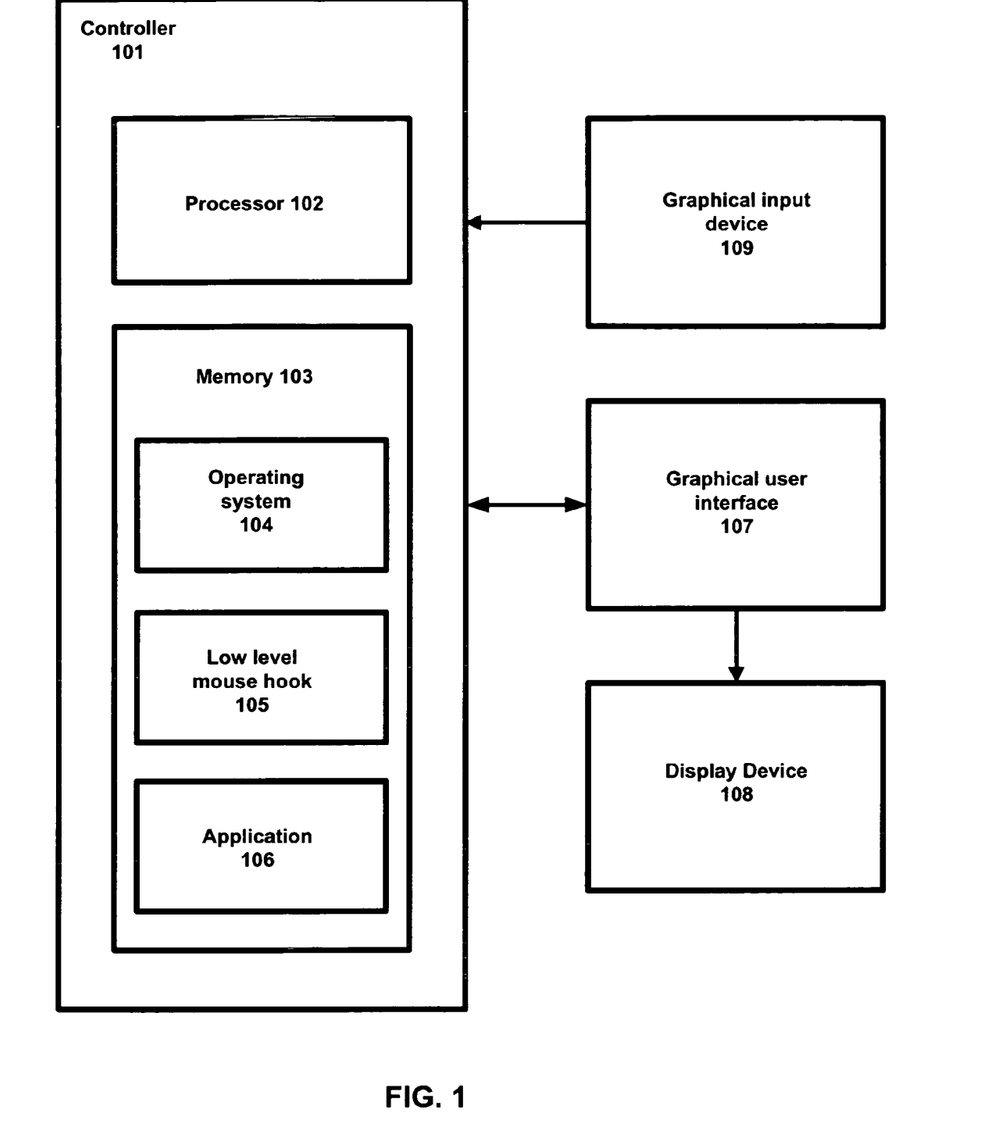
FIG. 1 is a block diagram of a cursor functionality system.

Referring to FIG. 1, a block diagram of a cursor functionality system suitable for practicing that invention will be discussed and described. A cursor functionality system for implementing cursor functionality comprises a controller 101. The controller 101 further comprises a processor 102 for executing software functions. The controller further comprises memory 103 for storing operating system instructions 104, low-level mouse hook subroutine instruction 105, and applications 106. The system further comprises a graphical user interface 107. The graphical user interface 107 is coupled with a single or a plurality of display devices 108. The system further comprises a single or a plurality of graphical input devices 109. As understood herein, the term "graphical input devices" are interpreted and construed broadly to mean any input device or any input functionality, software, hardware, or firmware, which generates continuous or discrete input signal based on human manipulation. It would be obvious to a person skilled in the art that such graphical input devices comprise any graphical, electronic, or sonic. input device. Examples of such graphical input devices include, but are not limited to, standard mice, modified mice, touch screens, drawing pads, game controllers, joysticks, multiple touch screens, touch pads, keyboards, and voice driven input systems, as well as various firmware, etc. Examples of memory 103 include, but are not limited to, magnetic tapes, magnetic drums, magnetic disks, CDs, optical storage, RAM, ROM, EEPROM, EPROM, flash memory, or any other suitable storage media. Memory 103 may be fixed or removable. Graphical input devices 109 may be connected to controller 101 via serial port, USB port, or PS/2 port, or other connection types. Graphical input devices 109 may be connected to controller 101 via wire, IR, wireless, or remotely, such as over the Internet, and other means. The methods described herein are best facilitated in software code installed and operated on a processor 102 as part of the operating system 104, low level mouse hook 105, or an application 106. The development of the code, given the instructions herein, requires ordinary skill in the art and is easily accomplished by software developers or programmers of ordinary skill.

Figure 2:
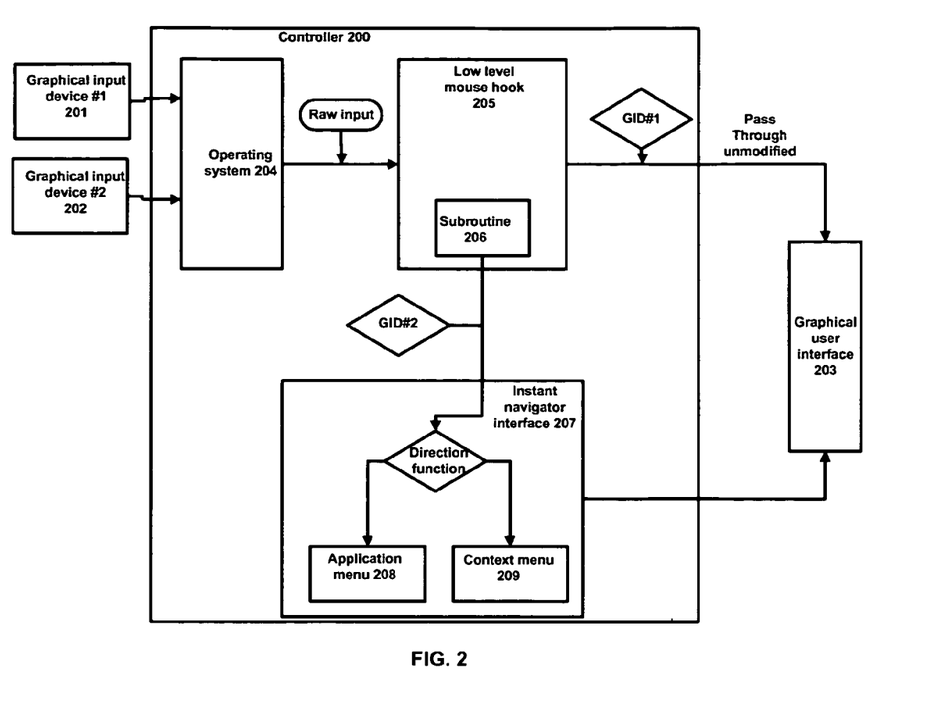
FIG. 2 is a cursor functionality system according to one exemplary implementation (Instant Navigator application)

Turning now to FIG. 2, a cursor functionality system is illustrated in block diagram according to one exemplary implementation of that invention. According to this embodiment, a cursor functionality system comprising two graphical input devices is illustrated in the figure herein. However, the system and method described for the invention is not limited to a system with two graphical input devices. On the contrary, the invention is intended to cover an interface system utilizing a single or a plurality of graphical input devices, as illustrated in FIG. 2: a cursor functionality system comprising controller 200, graphical input device #1 201, graphical input device #2 202, and graphical user interface 203. Controller 200 accepts inputs from graphical input device #1 201 and graphical input device #2 202. Operating system 204 generates raw input and passes raw input to low-level mouse hook 205. Subroutine 206, within low-level mouse hook 205, monitors raw input message. Subroutine 206 determines which graphical input device generates the raw input message. If, for example, the raw input message is generated by graphical input device #1 201, it will pass through unmodified, and reaches the target window procedure, it will be used to generate a cursor or control point via the graphical user interface 203. If subroutine 206 determines that the raw input message is generated by graphical input device #2 202, subroutine 206 calls a direction function and generates Instant Navigator interface 209 via graphical user interface 203. Depending on the direction of the movements of graphical input device #2 202, subroutine 206 instructs different responses and procedures under Instant Navigator interface 209. According to the embodiment illustrated in FIG. 2, an application menu 208 is generated if the direction is determined to be dominantly horizontal (left-right). A context menu 209 is generated if the direction is determined to be dominantly vertical (up-down). It would be obvious to a person skilled in the art that other pre-defined directions could be adopted for application menu 208 or context menu 209.

Figure 3:
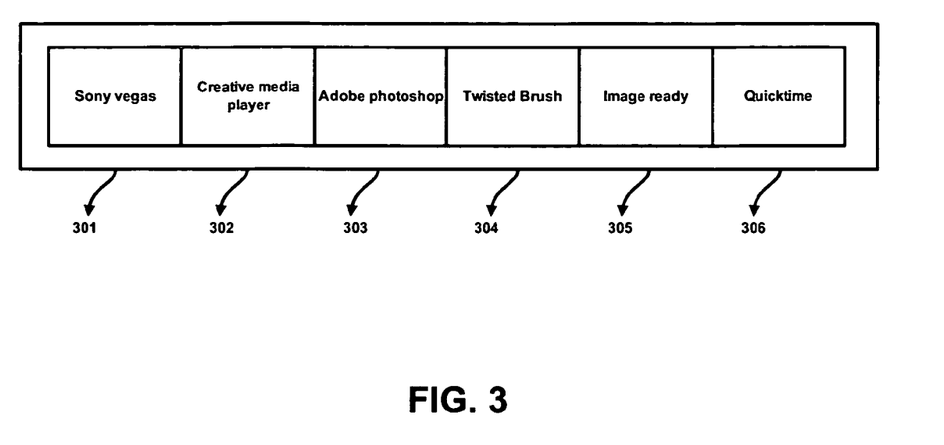
FIG. 3 is a diagrammatic illustration of an application menu according to one exemplary implementation (Instant Navigator application)

FIG. 3 is a diagrammatic illustration of an application menu 208 according to one exemplary implementation of that invention. As shown in FIG. 3, application menu 208 provides a shortcut to various application programs. When graphical input device moves to specific application program shortcut and clicks the application program, the application program is highlighted and the application program opens. Preferably, application menu 208 contains all selected active applications on graphical display. Optimally, application menu 208 could be pre-defined by users. An example of application menu 208 is shown in FIG. 3 comprising shortcuts to Sony Vegas 301, Creative Media player 302, Adobe Photoshop 303, Twisted Brush 304, Image Ready 305, and QuickTime 306.

Figure 4:
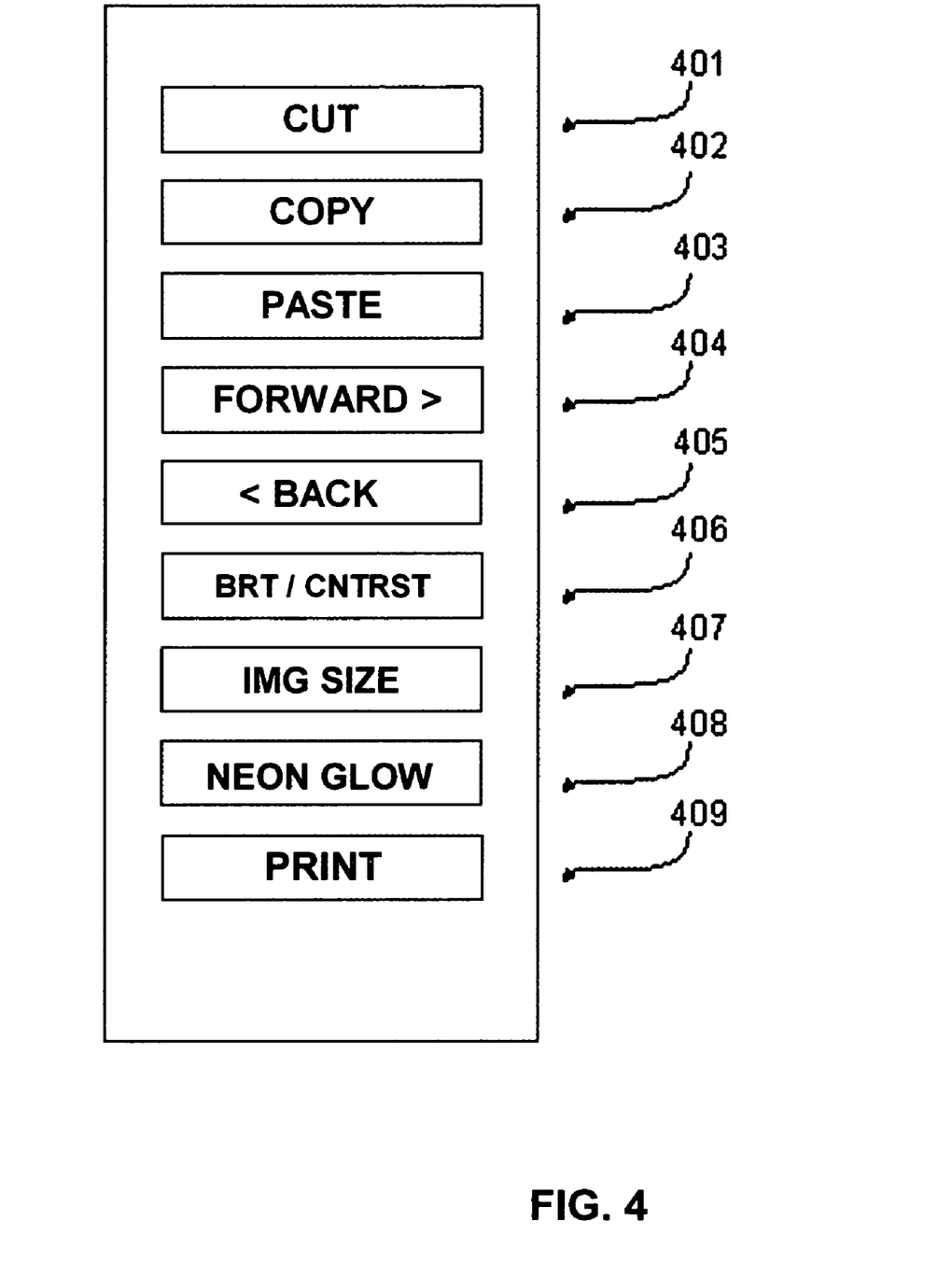
FIG. 4 is a diagrammatic illustration of a context menu according to one exemplary implementation (Instant Navigator application)

FIG. 4 is a diagrammatic illustration of a context menu 209 according to one exemplary implementation of that invention. As shown in FIG. 4, the context menu provides a shortcut to various actions to be performed within an application program in use. When graphical input device moves to specific action shortcut within an application program and clicks the action icon, the action is activated. Preferably, the context menu contains user pre-defined actions. An example of context menu is shown in FIG. 4 comprising shortcuts to actions within Adobe Photoshop: cut 401, copy 402, paste 403, forward>404, <back 405, etc.

Figure 5:
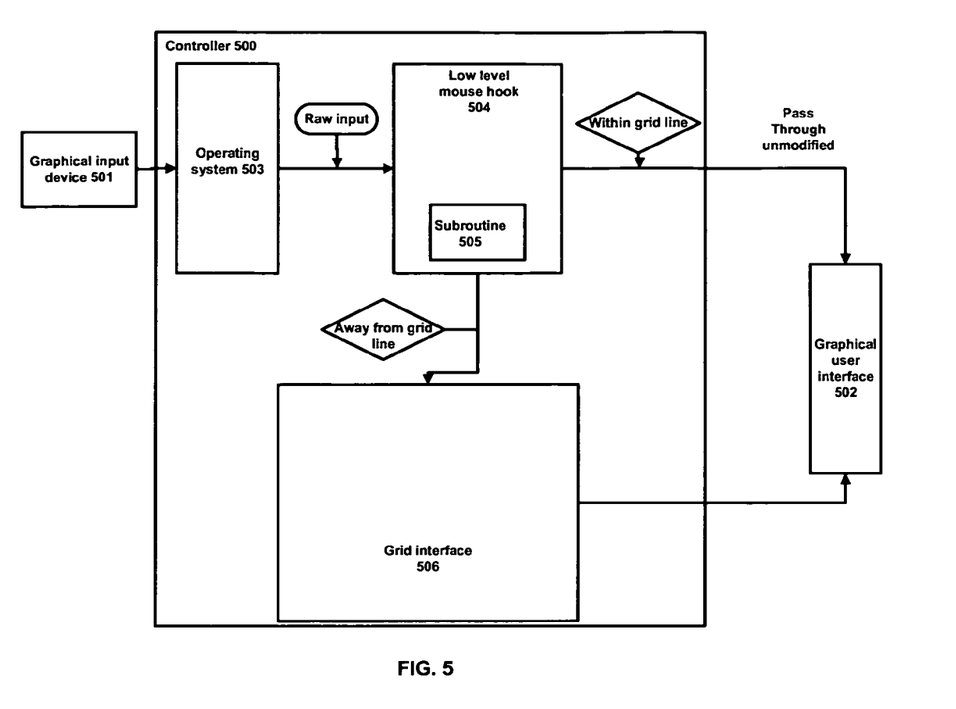
FIG. 5 is a cursor functionality system according to another exemplary implementation (Grid application)

Turning now to FIG. 5, a cursor functionality system is illustrated in block diagram according to another exemplary implementation of that invention. According to this embodiment, a cursor functionality system comprising one graphical input device is illustrated in the figure herein. However, the system and method described for the invention is not limited to a system with one graphical input device. On the contrary, the invention is intended to cover an interface system utilizing a single or a plurality of graphical input devices. As illustrated in FIG. 5, a cursor functionality system comprising controller 500, graphical input device 501, and graphical user interface 502. Controller 500 accepts inputs from graphical input device 501. Operating system 503 generates raw input and passes raw input to low-level mouse hook 504. Subroutine. 505, within low-System level mouse hook 504, monitors raw input message. Subroutine 505 determines whether graphical input device 501 is moving along a pre-defined grid line. If graphical input device 501 is moving along a pre-defined grid line, raw input messages will pass through unmodified and reaches the target window procedure. For example, it will be used to generate a cursor or control point via the graphical user interface 502. If subroutine 505 determines graphical input device 501 is not moving along a pre-defined grid line, subroutine 505 calls a movement adjustment function and generates grid application 506 via graphical user interface 502. Grid application 506 restricts the movement of cursor or control point generated by graphical input device 501 to a pre-defined grid line.

Figure 6:
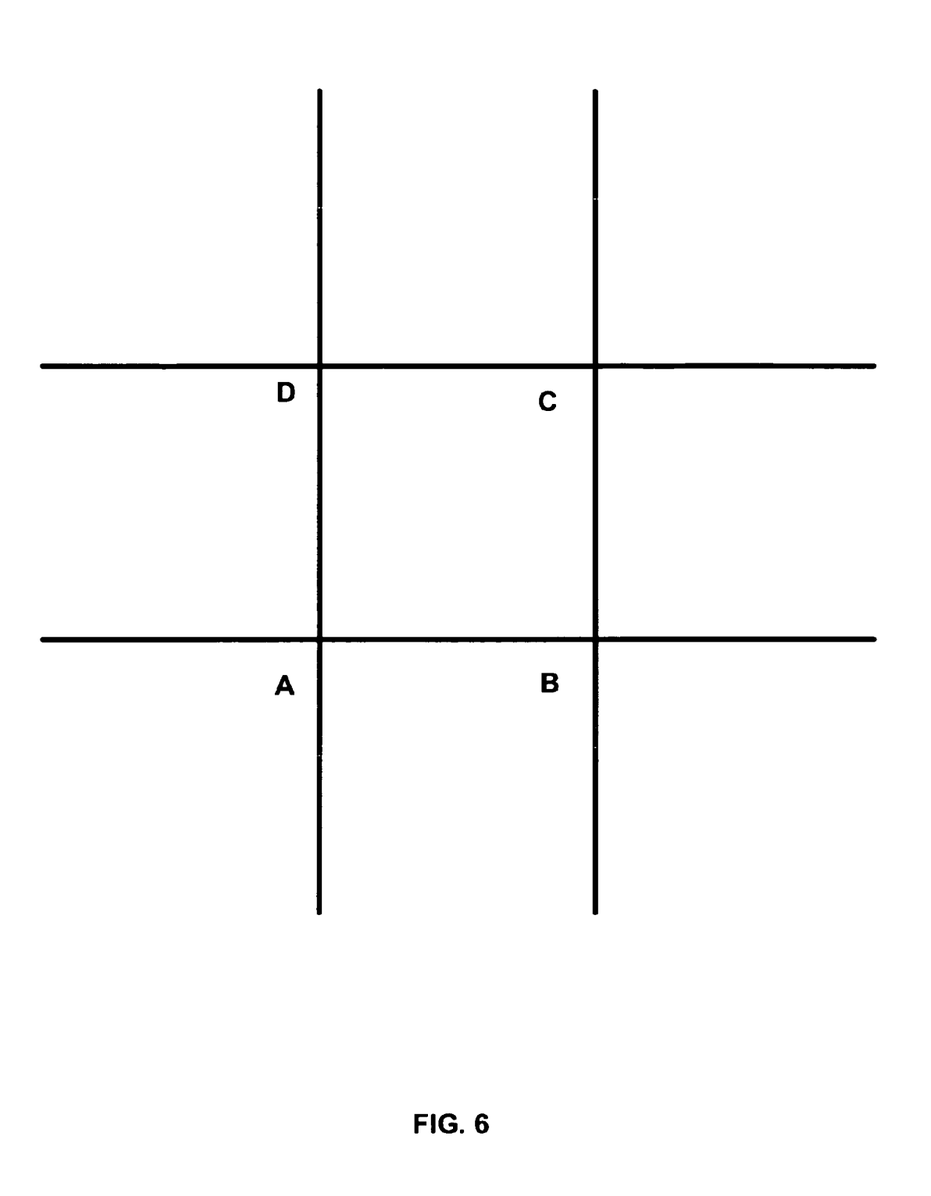
FIG. 6 is a diagrammatic illustration of an exemplary pre-defined grid line.

FIG. 6 is a diagrammatic illustration of a pre-defined grid line comprising AB, BC, CD, and DA. When cursor or control point generated by graphical input device 501 is moving according to this pre-defined grid line, e.g. from A to B, subroutine 206 does not call a movement adjustment function, and raw input message passes through unmodified. When cursor or control point generated by graphical input device 501 is moving away from this pre-defined grid line, e.g. from A to C, subroutine 206 calls a movement adjustment function and processes the raw input message under grid application 506. Grid application 506 restricts the movement of cursor or control point generated by graphical input device 501 to a pre-defined grid line, e.g. from A to B, and then to C.

It would be obvious to a person skilled in the art that other pre-defined grid lines could be adopted for the system described herein.

Figure 7:
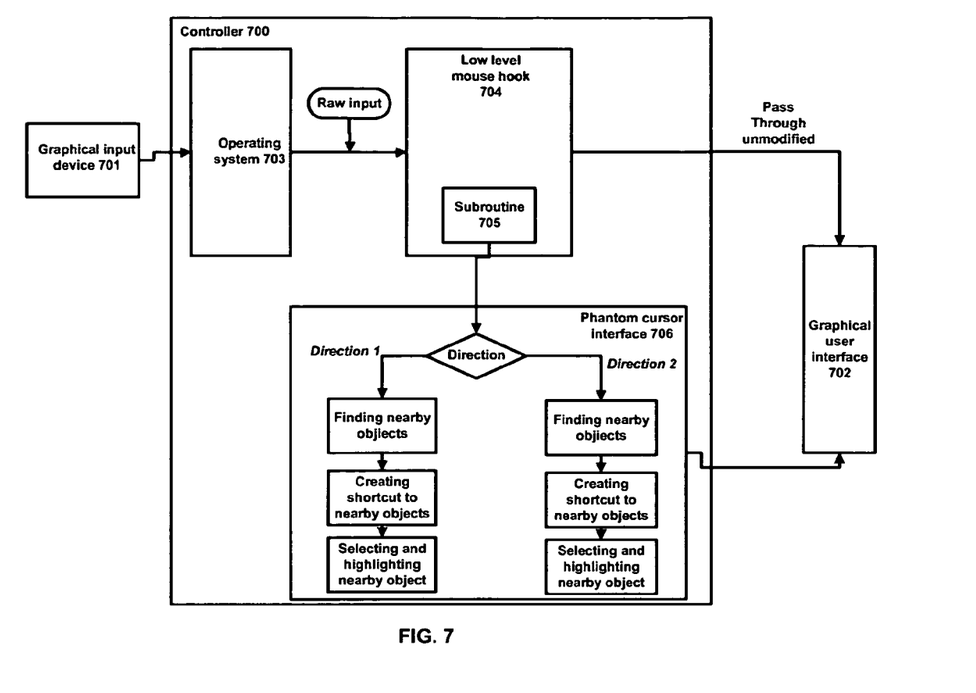
FIG. 7 is a cursor functionality system according to another exemplary implementation (Phantom Cursor application)

Turning now to FIG. 7, a cursor functionality system is illustrated in block diagram according to another exemplary implementation of that invention. According to this embodiment, a cursor functionality system comprising one graphical input device is illustrated in the figure herein. However, the system and method described for the invention is not limited to a system with one graphical input device. On the contrary, the invention is intended to cover an interface system utilizing a single or a plurality of graphical input devices. Illustrated in FIG. 7 is a cursor functionality system comprising controller 700, graphical input device 701, and graphical user interface 702. Controller 700 accepts inputs from graphical input device 701. Operating system 703 generates raw input and passes raw input to low-level mouse hook 704. Subroutine 705, within low-level mouse hook 704, monitors raw input messages. Raw input messages pass through unmodified for generating system cursor or control point via graphical user interface 702. Upon receiving raw input message, subroutine 505 generates Phantom Cursor interface 706 via graphical user interface 702. According to the position and movement of the cursor or control point, subroutine 505 generates Phantom Cursor interface 706 via graphical user interface 702 in response to the position and movement of the cursor or control point. Based on the position of the cursor or control point, objects within a single or a plurality of pre-selected definitions, such as icons, menu bars, etc., are selected and highlighted within Phantom Cursor interface 706. Based on the movement of the cursor and control point, objects within a single or a plurality of pre-selected definitions are selected and highlighted in different modes. If the cursor or control point is moving along a vertical direction (up-down), the Phantom Cursor interface 706 selects and highlights objects within a single or a plurality of pre-selected definitions, and the selection and highlight move from object to object in a vertical direction in response to cursor movement. If the cursor or control point is moving along a horizontal direction (left-right), the Phantom Cursor interface 706 selects and highlights objects within a single or a plurality of pre-selected definitions, and the selection and highlight move from object to object in a horizontal direction in response to cursor movement. Examples of pre-selected definitions include, but are not limited to, a single or a plurality of pre-selected definitions, a pre-defined icon or button, a pre-defined function within an application, a pre-defined object, etc. It would be obvious to a person skilled in the art that various alternative pre-selected definitions can be defined by users.

Preferably, cursor or control point overrides actions by the Phantom Cursor interface. The selections and highlights by Phantom Cursor interface can be activated under certain pre-defined circumstances. For example, Phantom Cursor interface can be activated by holding the control key, and by clicking the button on graphical input device. It would be obvious to a person skilled in the art that various alternative methods can be used to activate the Phantom Cursor interface activities.

Figure 8:
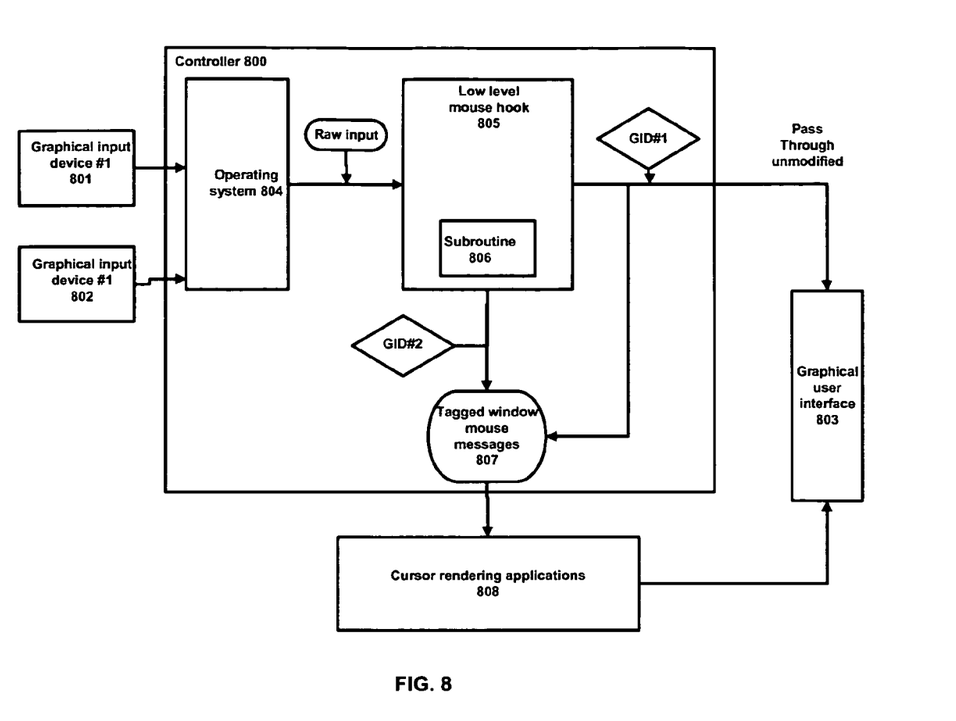
FIG. 8 is a cursor functionality system according to another exemplary implementation (tagged window message application)

Turning now to FIG. 8, a cursor functionality system is illustrated in block diagram according to one exemplary implementation of that invention. According to this embodiment, a cursor functionality system comprising two graphical input devices is illustrated in the figure herein. However, the system and method described for the invention is not limited to a system with two graphical input devices. On the contrary, the invention is intended to cover an interface system utilizing a single or a plurality of graphical input devices. Illustrated in FIG. 8 is a cursor functionality system comprising controller 800, graphical input device #1 801, graphical input device #2 802, and graphical user interface 803. Controller 800 accepts inputs from graphical input device #1 801 and graphical input device #2 802. Operating system 804 generates raw input and passes raw input to low-level mouse hook 805. Subroutine 806, within low-level mouse hook 805, monitors raw input messages. Subroutine 806 determines which graphical input device generates the raw input message. If raw input message is generated by graphical input device #1 801, it will pass through unmodified and reach the target window procedure. For example, it will be used to generate a cursor or control point via the graphical user interface 803. Subroutine 806 determines that a raw input message is generated by either graphical input device #1 801 or graphical input device #2 802; subroutine 806 generates tagged window mouse messages 807 corresponding to specific graphical input devices 801 or 802.

Figure 9:
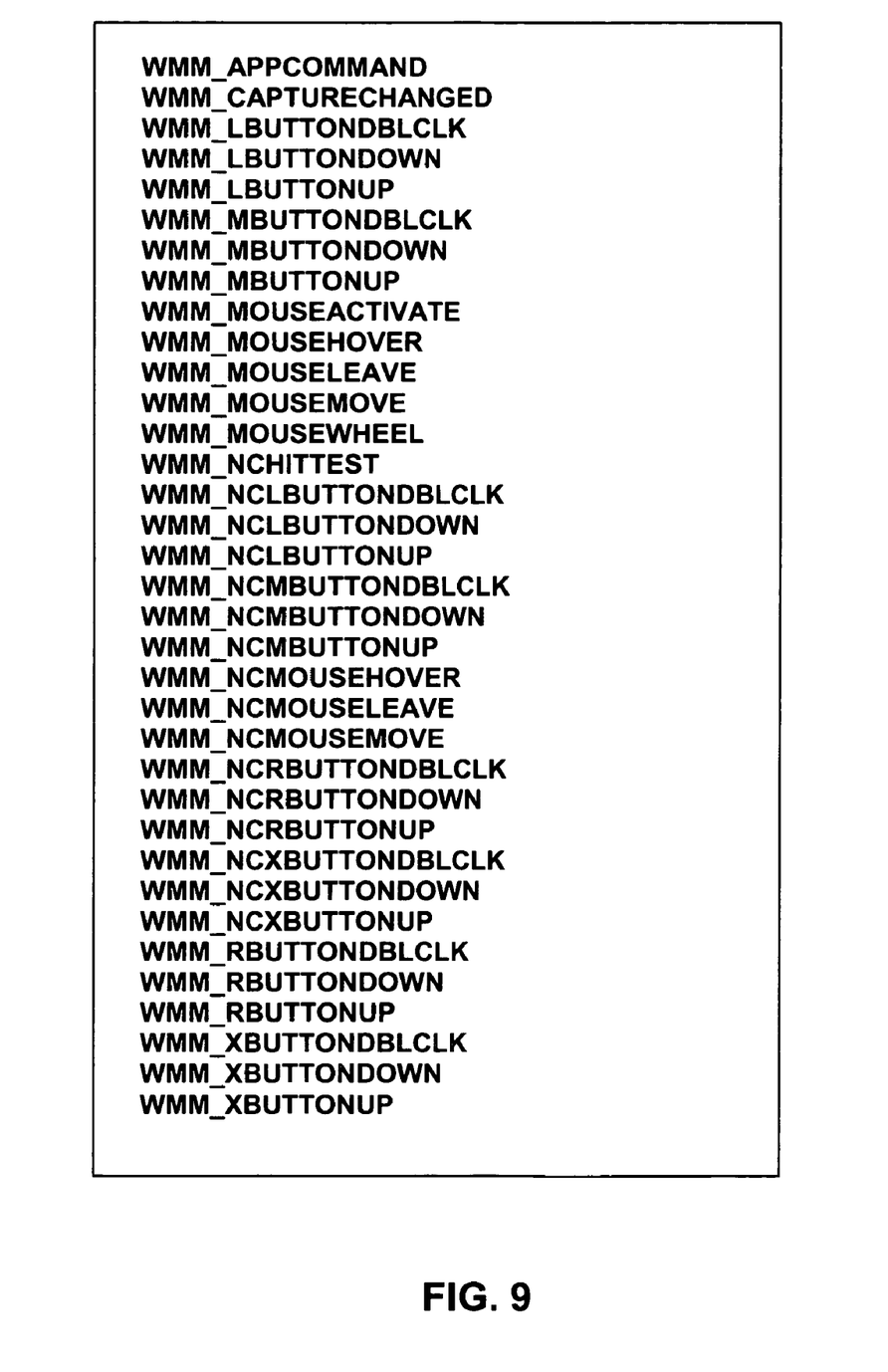
FIG. 9 lists some examples of tagged window messages.

Tagged window mouse messages 807 comprise messages describing mouse functions. As understood herein, the term "tagged window mouse messages" is interpreted and construed broadly to mean newly generated mouse messages by subroutine 806 to mirror the functionality of the standard windows mouse messages. It would be obvious to a person skilled in the art that such tagged window mouse messages can be tagged with a unique label, e.g. "WMM_". As illustrated in FIG. 9, examples of such tagged messages include, but are not limited to: WMM_APPCOMMAND, WMM_CAPTURECHANGED, WMM_LBUTTONDBLCLK, WMM_LBUTTONDOWN, WMM_LBUTTONUP, WMM_MBUTTONDBLCLK, WMM_MBUTTONDOWN, WMM_MBUTTONUP, WMM_MOUSEACTIVATE, WMM_MOUSEHOVER, WMM_MOUSELEAVE, WMM_MOUSEMOVE, WMM_MOUSEWHEEL, WMM_NCHITTEST, WMM_NCLBUTTONDBLCLK, WMM_NCLBUTTONDOWN, WMM_NCLBUTTONUP, WMM_NCMBUTTONDBLCLK, WMM_NCMBUTTONDOWN, WMM_NCMBUTTONUP, WMM_NCMOUSEHOVER, WMM_NCMOUSELEAVE, WMM_NCMOUSEMOVE, WMM_NCRBUTTONDBLCLK, WMM_NCRBUTTONDOWN, WMM_NCRBUTTONUP, WMM_NCXBUTTONDBLCLK, WMM_NCXBUTTONDOWN, WMM_NCXBUTTONUP, WMM_RBUTTONDBLCLK, WMM_RBUTTONDOWN, WMM_RBUTTONUP, WMM_XBUTTONDBLCLK, WMM_XBUTTONDOWN, WMM_XBUTTONUP.

As illustrated in FIG. 8, tagged window mouse messages 807 can be used by cursor rendering applications 808 to generate a single or a plurality of cursors or control points via graphical user interface 803. Systems and methods for cursor rendering applications 808 are described in U.S. patent application Ser. No. 11/001,328, filed Nov. 30, 2004, entitled "IMPROVED COMPUTER INTERFACE SYSTEM USING MULTIPLE INDEPENDENT GRAPHICAL DATA INPUT DEVICES", by James Fairs, Vlad Zarney, and Daniel E. Schaaf.

Turning now more particularly to the teachings of this invention, this specification describes an improved system for implementing novel functionality associated with cursors or control points. Reference is made in detail to the preferred embodiments of the invention. While the invention is described in conjunction with the preferred embodiments, the invention is not intended to be limited by these preferred embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, the invention may be practiced without these specific details.

Figure 10:
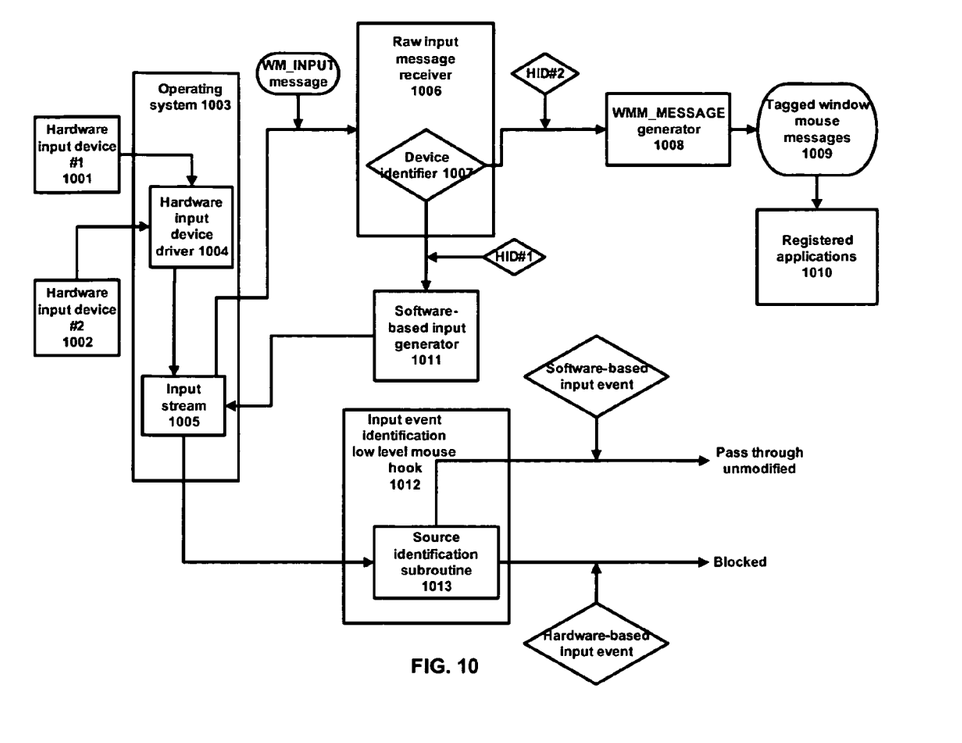
FIG. 10 is a multiple computer input generation system according to an exemplary implementation of the present invention.

Referring to FIG. 10, a multiple computer input generation system is illustrated in block diagram according to an exemplary implementation of the present invention. According to this embodiment, a multiple computer input generation system comprising two hardware input devices is illustrated in the figure herein. However, the system and method described for the invention is not limited to a system with two hardware input devices. On the contrary, the invention is intended to cover a multiple computer input generation system utilizing a single or a plurality of hardware input devices. Illustrated in FIG. 10 is a multiple computer input generation system hardware input device #1 1001, hardware input device #2 1002, operating system 1003, raw input message receiver 1006, software-based input generator 1011, low-level mouse hook 1012, and WMM_MESSAGE generator 1008. Operating system 1003 accepts inputs from hardware input device #1 1001 and hardware input device #2 1002. As understood herein, the term "hardware input devices" are interpreted and construed broadly to mean any input device or any input functionality, software, hardware, or firmware, which generates continuous or discrete input signal based on human manipulation. It would be obvious to a person skilled in the art that such hardware input devices comprise any graphical, electronic, or sonic input device. Examples of such hardware input devices include, but are not limited to, standard mice, modified mice, touch screens, drawing pads, game controllers, joysticks, multiple touch screens, touch pads, keyboards, and voice driven input systems, as well as various firmware, etc.

As illustrated in FIG. 10, hardware input device driver 1004, within operating system 1003, accepts input from hardware input device #1 1001 and hardware input device #2 1002. Hardware input device driver 1004 interprets input from hardware input devices and places appropriate input events into input stream 1005. Operating system 1003 further processes input events and generates WM_INPUT message. WM_INPUT message is sent to raw input message receiver 1006. Raw input message receiver 1006 further comprises device identifier 1007. Device identifier 1007 monitors raw input messages. Device identifier 1007 further determines which hardware input device generates WM_INPUT message. If WM_INPUT message is generated by one of the hardware input devices, e.g., hardware input device #2 1002, device identifier 1007 will pass WM_INPUT message to WMM_MESSAGE generator 1008. It would be obvious to a person skilled in the art that WM_MESSAGE generator 1008 can also accept WM_INPUT from the other hardware input devices, e.g. hardware input device #1 1001. WMM_MESSAGE generator 1008 generates tagged window mouse messages 1009 corresponding to hardware input device #2 1002. Tagged window mouse messages 1009 comprise messages describing mouse functions. As understood herein, the term "tagged window mouse messages" is interpreted and construed broadly to mean newly generated mouse messages by WMM_MESSAGE generator 1008 to mirror the functionality of the standard windows mouse messages. It would be obvious to a person skilled in the art that such tagged window mouse messages can be tagged with a unique label, e.g. "WMM_". As illustrated in FIG. 9, examples of such tagged messages include, but are not limited to: WMM_APPCOMMAND, WMM_CAPTURECHANGED, WMM_BUTTONDBLCLK, WMM_BUTTONDOWN, WMM_BUTTONUP, WMM_MBUTTONDBLCLK, WMM_MBUTTONDOWN, WMM_MBUTTONUP, WMM_MOUSEACTIVATE, WMM_MOUSEHOVER, WMM_MOUSELEAVE, WMM_MOUSEMOVE, WMM_MOUSEWHEEL, WMM_NCHITTEST, WMM_NCLBUTTONDBLCLK, WMM_NCLBUTTONDOWN, WMM_NCLBUTTONUP, WMM_NCMBUTTONDBLCLK, WMM_NCMBUTTONDOWN, WMM_NCMBUTTONUP, WMM_NCMOUSEHOVER, WMM_NCMOUSELEAVE, WMM_NCMOUSEMOVE, WMM_NCRBUTTONDBLCLK, WMM_NCRBUTTONDOWN, WMM_NCRBUTTONUP, WMM_NCXBUTTONDBLCLK, WMM_NCXBUTTONDOWN, WMM_NCXBUTTONUP, WMM_RBUTTONDBLCLK, WMM_RBUTTONDOWN, WMM_RBUTTONUP, WMM_XBUTTONDBLCLK, WMM_XBUTTONDOWN, WMM_XBUTTONUP.

As illustrated in FIG. 10, tagged window mouse messages 1007 can be dispatched and used by registered applications 1010. Optionally, tagged window mouse messages 1007 can be dispatched and used by a single or a plurality of cursor rendering applications to generate a single or a plurality of cursors or control points via graphical user interface. Systems and methods for cursor rendering applications are described in U.S. patent application Ser. No. 11/001,328, filed Nov. 30, 2004, entitled "IMPROVED COMPUTER INTERFACE SYSTEM USING MULTIPLE INDEPENDENT GRAPHICAL DATA INPUT DEVICES", by James Fairs, Vlad Zarney, and Daniel E. Schaaf.

As illustrated in FIG. 10, device identifier 1007 monitors raw input messages. Device identifier 1007 further determines which hardware input device generates WM_INPUT message. If WM_INPUT message is generated by one of the hardware input devices, e.g., hardware input device #1 1001, device identifier 1007 will pass raw input message to software-based input generator 1011. It would be obvious to a person skilled in the art that software-based input generator 1011 can also accept WM_INPUT from the other hardware input devices, e.g. hardware input device #1 1002. Based on the WM_INPUT message, software-based input generator 1011 generates equivalent software-based input event. The newly generated software-based input event can be tagged with unique identifier. The newly generated software-based input event carries input messages including, but not limited to, hardware device control point coordination, hardware device movements, hardware device button states, hardware device relative displacements, hardware device wheel states, etc. The software-based input event is further feedback to operating system 1003 and injected into input stream 1005 within operating system 1003.

The software-based input event generated by software-based input generator 1011 is placed into input stream 1005. The hardware input event describing hardware input device functions is processed by hardware input device driver 1004 and also placed into input stream 1005. The software-based input event and the hardware-based input event contained within input stream 1005 are examined by input event identification low-level mouse hook 1012. Input event identification low-level mouse hook 1012 further comprises source identification subroutine 1013. Source identification subroutine 1013 determines the source of the input event from input stream 1005. Source identification subroutine 1013 further discerns the software-based input event from the hardware-based input event. Source identification subroutine 1013 blocks the hardware-based input event. Source identification subroutine 1011 passes through the software-based input event unmodified. The software-based input event is used for the target window procedures. For example, it will be used to generate a cursor or control point via the graphical user interface.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention shall not be limited by this Detailed Description, but rather by Claims following.

What is claimed is:

1. A computer-implemented method for multiple control points using independent graphical input, comprising the following steps:
   multiple, independent computer inputs' generation, which comprise:
   accepting inputs from a plurality of hardware input devices;
   converting said inputs from said hardware input devices into raw input messages;
   monitoring by a device identifier, said raw input messages, wherein said raw input messages are identified according to said hardware input devices;
   discerning by said device identifier, said raw input messages according to said hardware input devices, wherein said raw input messages generated by a plurality of pre-defined hardware input devices are selected;
   passing the raw input messages to a software-based input generator;
   generating by a tagged message generator, tagged windows mouse messages for said selected raw input messages; and
   discerning a software-based input event from a hardware-based input event, allowing only the software-based input event to pass through unmodified.

2. A method as in claim 1, wherein said tagged window mouse messages are used as inputs for a plurality of registered applications.

3. A computer-implemented method for multiple control points using independent graphical input, comprising the following steps:
   multiple, independent computer inputs' generation, which comprise:
   accepting inputs from a plurality of hardware input devices;
   converting said inputs from said hardware input devices into raw input messages;
   monitoring by a device identifier, said raw input messages, wherein said raw input messages are identified according to said hardware input devices;
   discerning by said device identifier, said raw input messages according to said hardware input devices, wherein said raw input messages generated by a plurality of pre-defined hardware input devices are selected;
   passing the raw input messages to a software-based input generator;
   generating by the software based input generator, software-based input event for said selected raw input messages; and
   discerning a software-based input event from a hardware-based input event, allowing only the software-based input event to pass through unmodified.

4. A method as in claim 3, wherein said software-based input event is injected back to an input stream.

5. A method as in claim 4, wherein said input stream passes said software-based input event to a single or a plurality of low-level mouse hook;
   wherein a single or a plurality of source identification subroutines reside within said low-level mouse hook;
   wherein said source identification subroutines discern said software-based input event from hardware-based input event.

6. A method as in claim 5, wherein said hardware-based input event is blocked within said source identification subroutines.

7. A method as in claim 5, wherein said software-based input event is passed through unmodified to target window procedures.

8. An electronic device for implementing improved cursor functionality, comprising:
   means for generating multiple, independent computer inputs;
   a single or a plurality of data processors, wherein the said single or plurality of data processors operate in accordance with a stored program;
   a single or a plurality of memories; and
   a single or a plurality of graphical user interfaces;
   wherein said memory further comprises a single or a plurality of operating systems, and a single or a plurality of low-level mouse hooks;
   wherein said operating system accepts inputs from a plurality of hardware input devices, said operating system converts inputs from said hardware input devices into raw input messages;
   wherein said single or plurality of data processors further comprise device identifiers operating in accordance with a stored program to monitor said raw input messages, said raw input messages are identified according to said hardware input devices;
   wherein said single or plurality of data processors comprising said device identifiers further operate in accordance with a stored program to discern said raw input messages according to said hardware input devices, wherein said raw input messages generated by a plurality of pre-defined hardware input devices are selected;
   means for passing the raw input messages to a software-based input generator;
   wherein said single or plurality of data processors further comprise tagged message generators operating in accordance with a stored program to generate tagged windows mouse messages for said selected raw input messages; and
   means for discerning a software-based input event from a hardware-based input event, allowing only the software-based input event to pass through unmodified.

9. An electronic device as in claim 8, wherein said tagged window mouse messages are used as inputs for a plurality of registered applications.

10. An electronic device for implementing improved cursor functionality, comprising:
    means for generating multiple, independent computer inputs;
    a single or a plurality of data processors, wherein the said single or plurality of data processors operate in accordance with a stored program;
    a single or a plurality of memories; and
    a single or a plurality of graphical user interfaces;

wherein said memory further comprises a single or a plurality of operating systems, and a single or a plurality of low-level mouse hooks;

wherein said operating system accepts inputs from a plurality of hardware input devices, said operating system converts inputs from said hardware input devices into raw input messages;

wherein said single or plurality of data processors further comprise device identifiers operating in accordance with a stored program to monitor said raw input messages, said raw input messages are identified according to said hardware input devices;

wherein said single or plurality of data processors comprising said device identifiers further operate in accordance with a stored program to discern said raw input messages according to said hardware input devices, wherein said raw input messages generated by a plurality of pre-defined hardware input devices are selected;

means for passing the raw input messages to a software-based input generator;

wherein said software based input generator further comprises means to generate software-based input event for said selected raw input messages; and means for discerning a software-based input event from a hardware-based input event, allowing only the software-based input event to pass through unmodified.

11. An electronic device as in claim 10, wherein said single or plurality of data processors further operate in accordance with a stored program to inject said software-based input event back to an input stream.

12. An electronic device as in claim 11, wherein said single or plurality of data processors further operate in accordance with a stored program to send said software-based input event from said input stream to a single or a plurality of low-level mouse hook;

wherein a single or a plurality of source identification subroutines reside within said low-level mouse hook;

wherein said source identification subroutines discern said software-based input event from hardware-based input event.

13. An electronic device as in claim 12, wherein said hardware-based input event is blocked within said source identification subroutines.

14. An electronic device as in claim 12, wherein said software-based input event is passed through unmodified to target window procedures.

15. An article of manufacture comprising medium storing instructions that causes a processor-based system to:
    allow multiple independent computer inputs generation, which further causes the processor-based system to:
    accept inputs from a plurality of hardware input devices;
    convert said inputs from said hardware input devices into raw input messages;
    monitor by a device identifier, said raw input messages, wherein said raw input messages are identified according to said hardware input devices; and
    discern by said device identifier, said raw input messages according to said hardware input devices, wherein said raw input messages generated by a plurality of pre-defined hardware input devices are selected;
    pass the raw input messages to a software-based input generator; and
    generate by a tagged message generator, tagged windows mouse messages for said selected raw input messages; and
    discern a software-based input event from a hardware-based input event, allowing only the software-based input event to pass through unmodified.

16. An article of manufacture as in claim 15, wherein said tagged window mouse messages are used as inputs for a plurality of registered applications.

17. An article of manufacture comprising medium storing instructions that causes a processor-based system to:
    allow multiple independent computer inputs generation, which further causes the processor-based system to:
    accept inputs from a plurality of hardware input devices;
    convert said inputs from said hardware input devices into raw input messages;
    monitor by a device identifier, said raw input messages, wherein said raw input messages are identified according to said hardware input devices; and
    discern by said device identifier, said raw input messages according to said hardware input devices, wherein said raw input messages generated by a plurality of pre-defined hardware input devices are selected;
    pass the raw input messages to a software-based input generator;
    generate by a software based input generator, software-based input event for said selected raw input messages; and
    discern a software-based input event from a hardware-based input event, allowing only the software-based input event to pass through unmodified.

18. An article of manufacture as in claim 17, further storing instructions that cause a processor-based system to inject said software-based input event back to an input stream.

19. An article of manufacture as in claim 18, wherein said input stream passes said software-based input event to a single or a plurality of low-level mouse hook;
    wherein a single or a plurality of source identification subroutines reside within said low-level mouse hook;
    wherein said source identification subroutines discern said software-based input event from hardware-based input event.

20. An article of manufacture as in claim 19, wherein said hardware-based input event is blocked within said source identification subroutines.

21. An article of manufacture as in claim 19, wherein said software-based input event is passed through unmodified to target window procedures.

* * * * *